US006598480B2

United States Patent
Horiuchi et al.

(10) Patent No.: US 6,598,480 B2
(45) Date of Patent: Jul. 29, 2003

(54) VIBRATION TESTING SYSTEM

(75) Inventors: Toshihiko Horiuchi, Ushiku (JP);
Masaki Kurihara, Tsuchiura (JP);
Tomoyuki Hamada, Tsuchiura (JP);
Takao Konno, Minori (JP)

(73) Assignee: Hitachi, Ltd., Tokyo (JP)

( * ) Notice: Subject to any disclaimer, the term of this patent is extended or adjusted under 35 U.S.C. 154(b) by 41 days.

(21) Appl. No.: 09/994,863

(22) Filed: Nov. 28, 2001

(65) Prior Publication Data

US 2003/0109992 A1 Jun. 12, 2003

(30) Foreign Application Priority Data

Sep. 17, 2001 (JP) ......................................... 2001-280906

(51) Int. Cl.[7] .............................................. G01M 7/02
(52) U.S. Cl. ............................... 73/663; 702/56; 702/33
(58) Field of Search ........................ 73/662, 663, 664; 702/56, 33, 35, 30, 42, 113

(56) References Cited

U.S. PATENT DOCUMENTS

| 5,936,858 | A | * | 8/1999 | Arai | 700/30 |
|---|---|---|---|---|---|
| 6,257,067 | B1 | * | 7/2001 | Ankrom et al. | 73/663 |
| 6,341,258 | B1 | * | 1/2002 | Inoue et al. | 702/56 |
| 6,397,153 | B1 | * | 5/2002 | Yamagishi et al. | 702/42 |
| 6,493,689 | B2 | * | 12/2002 | Kotoulas et al. | 706/23 |

FOREIGN PATENT DOCUMENTS

| JP | 60013240 A | * | 1/1985 | ........... G01M/19/00 |
|---|---|---|---|---|
| JP | 05010846 A | * | 1/1993 | ............ G01M/7/02 |
| JP | 09079939 A | * | 3/1997 | ........... G01M/10/00 |
| JP | 10206304 A | * | 8/1998 | ............ G01N/3/00 |

* cited by examiner

Primary Examiner—Helen Kwok
Assistant Examiner—Rose M. Miller
(74) Attorney, Agent, or Firm—Antonelli, Terry, Stout & Kraus, LLP

(57) ABSTRACT

A main computer for performing numerical simulation and a sub-computer for controlling each shaking machine are provided. Data transfer between the main computer and sub-computer is performed by communications. The main computer is provided with a model substituting function of modeling a specimen to be shaken, a parameter modification function of sequentially modifying parameters of a model in accordance with the vibration test result, and an abnormality inspection function of judging an abnormality of each shaking system and if an abnormality is detected, substituting the measured value of a reaction force with an output of the model substituting function. It is possible to make an experiment of evaluating the strength and reliability of a massive structure, for example, relative to an earthquake and to make a vibration test at a high precision and with an economical cost.

18 Claims, 9 Drawing Sheets

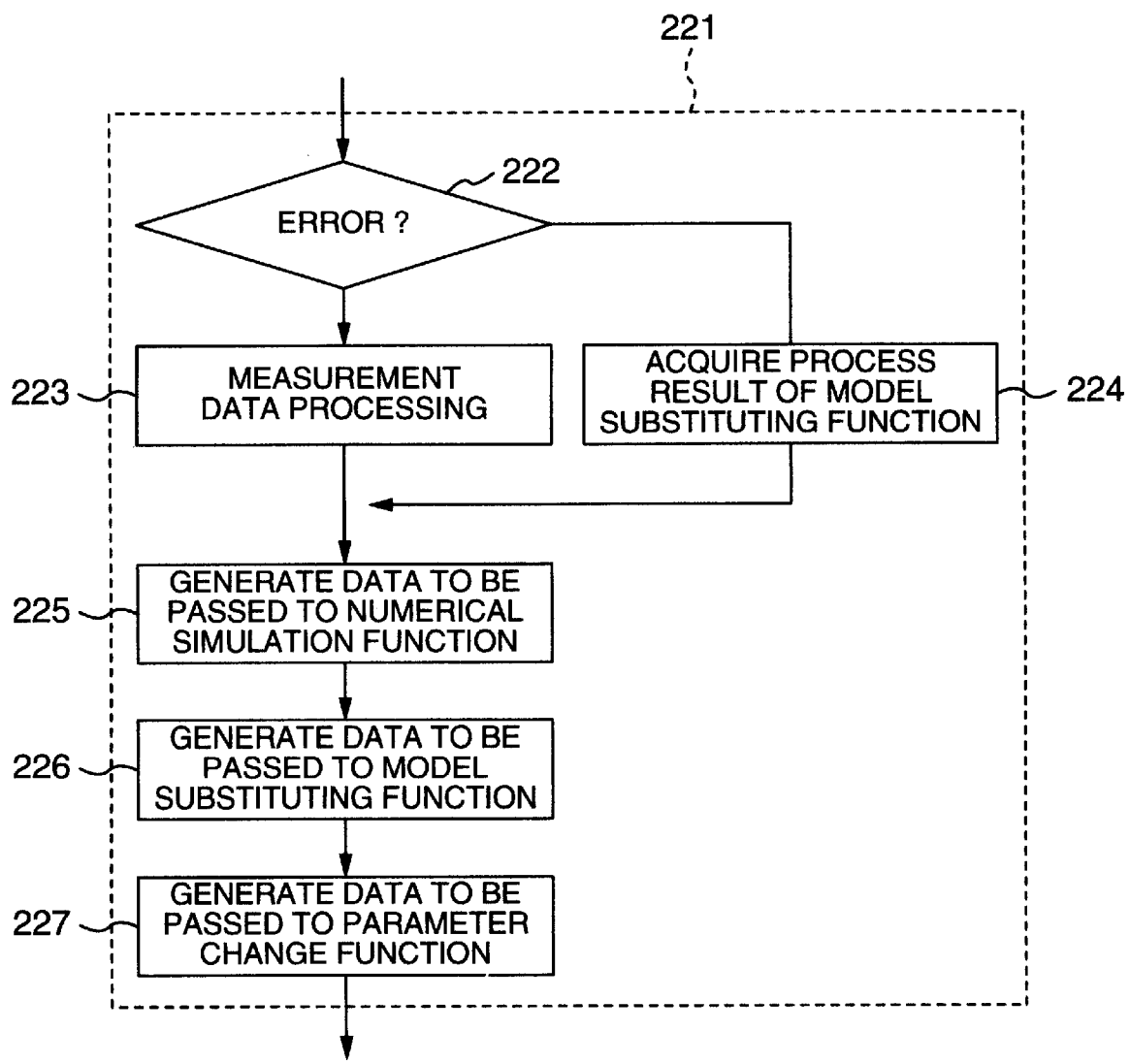

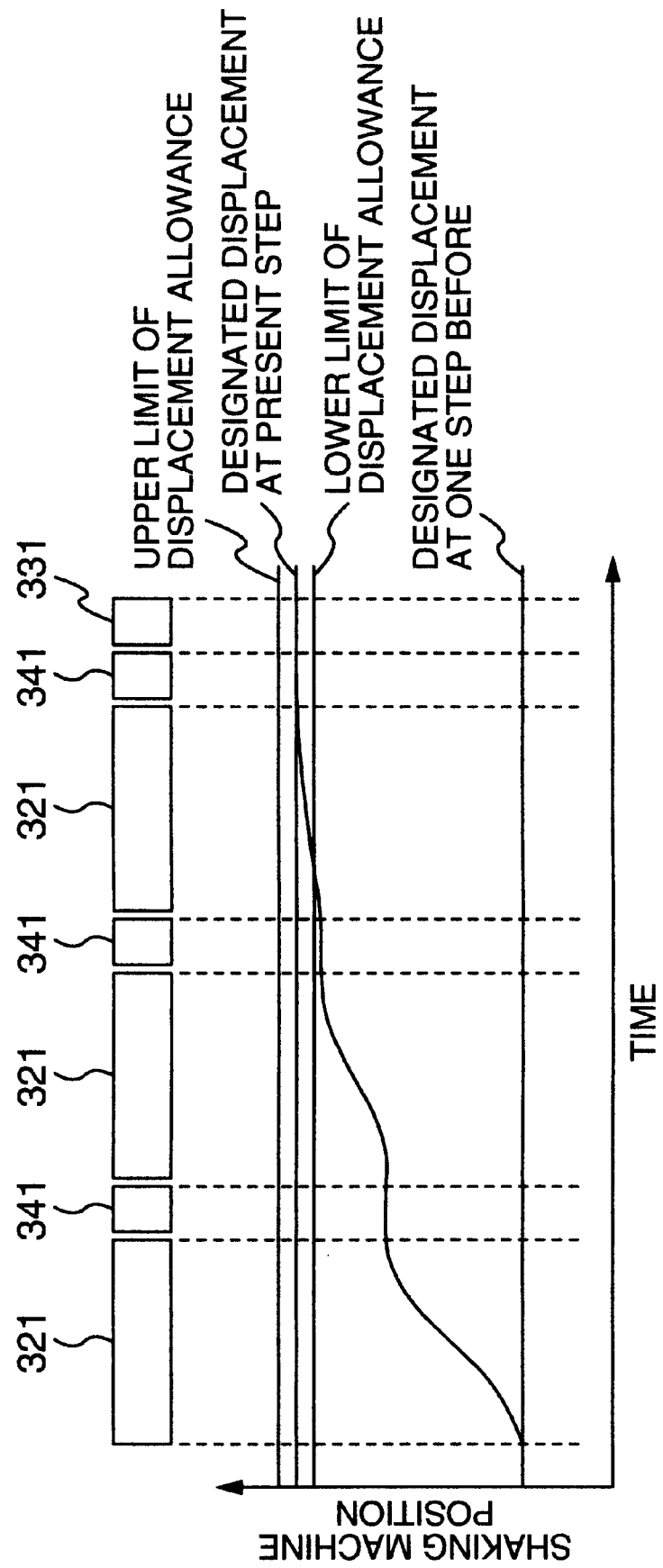

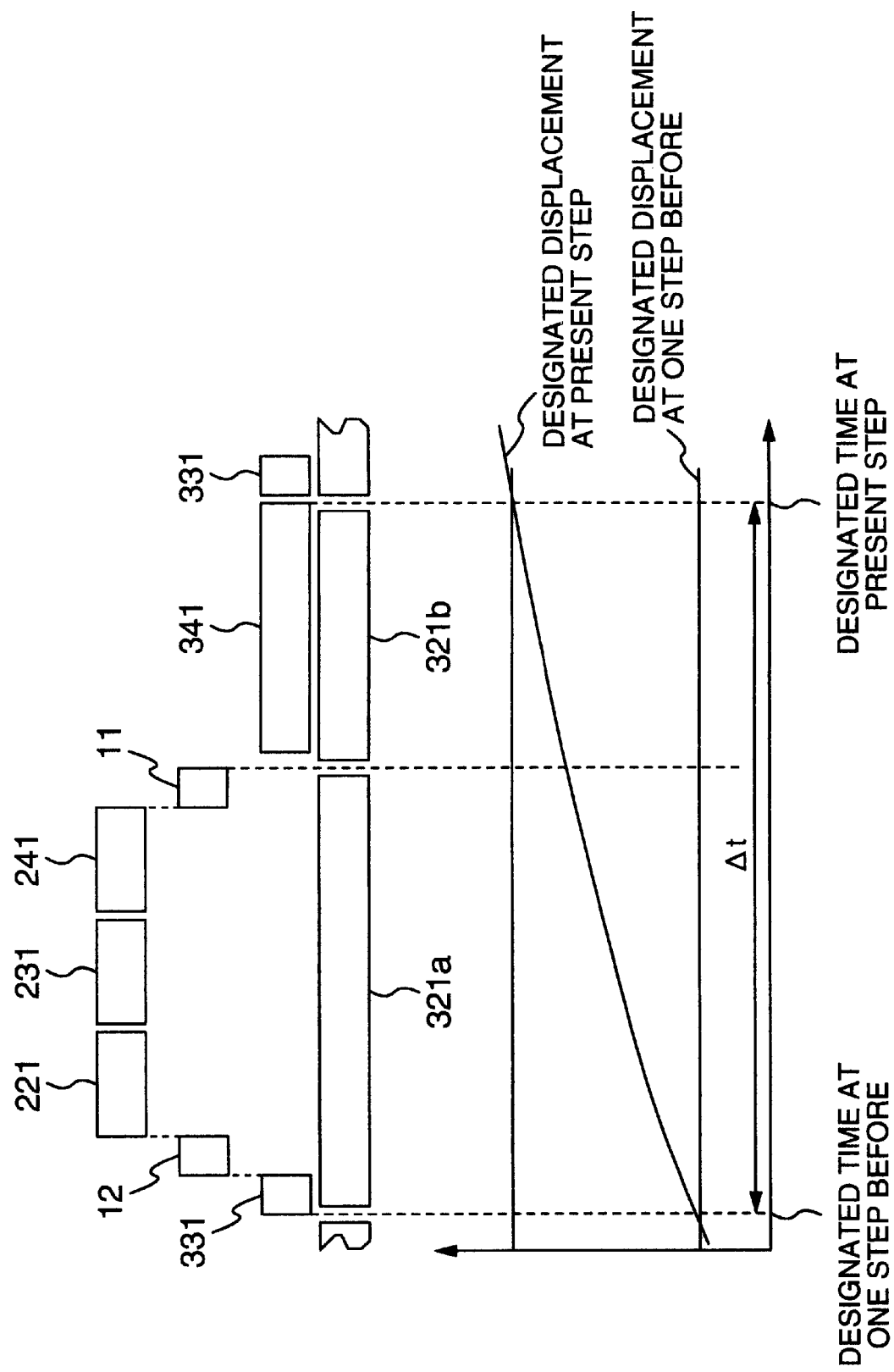

VIBRATION TESTING SYSTEM

BACKGROUND OF THE INVENTION

1. Field of the Invention

The present invention relates to a shaking testing system and a shaking testing method which load deformation and/or force to a structure, for example, to evaluate the characteristics of the structure influencing the earthquake response or to verify the strength and reliability of the structure, and more particularly relates to a vibration testing system and a vibration response evaluating method suitable for a massive structure.

2. Description of the Related Art

It is necessary to design a structure so as to have a sufficient strength relative to a load considered to be applied to the structure in actual use. For example, it is important to design an architectural structure and a civil structure to have a sufficient strength relative to earthquakes. A shaking test is therefore made in order to evaluate the vibration response of a structure relative to earthquakes or to evaluate the characteristics of components of the structure influencing the earthquake response. There are various shaking testing methods for these purposes. One of the methods is to apply deformation or force expected to be generated to a structure or its components when an earthquake occurs by using an actuator and to observe the response, the damage and the like.

For a shaking testing system suitable for a massive structure, a so-called hybrid experiment approach has been proposed. Through this method, a shaking state equivalent to a real shaking state of a specimen is reproduced by using a combination of numerical simulation and shaking test. This approach is disclosed, for example, in the publication of JP-A-60-13240. A machine and a method for realizing the hybrid experiment approach in real time is disclosed in the publication of JP-A-5-10846 (corresponding U.S. Pat. No. 5,388,056).

As techniques of utilizing a plurality of actuators at remote sites in cooperation, the publications of JP-A-9-79939 and JP-A-10-206304 disclose the system for sending command signals from a host computer to the actuators at remote sites via a network to drive the actuators.

When a massive structure is under testing, a specimen to be subjected to a shaking test is large or a plurality of specimens should be used. Although the shaking test may be made by using a plurality of actuators, it may happen that one of the actuators has some problem during the test and the shaking test becomes impossible to continue. In such a case, the whole test fails even if the other actuators operate normally.

It is difficult from the economical point of view that one experiment facility has experiment systems suitable for the shaking test of a massive structure. It is therefore desired to make an experiment by using cooperatively a plurality of experiment systems at several experiment facilities which are not necessarily near at each other. If a load of numerical simulation is large, it is desired to use a high performance computer such as a super computer. However, such a high performance computer is often located at a site different from those of shaking experiment systems. Therefore, even if a plurality of shaking systems are not used, it is necessary to make a hybrid experiment by using a remote site computer and a testing system. With the above-described conventional techniques, however, the computer performing numerical simulation also controls the shaking system to make a shaking test. Although it is suitable for making a test at one experiment facility, the conventional techniques do not solve the above-described problems.

The systems disclosed in the publications of JP-A-9-79939 and JP-A-10-206304 do not consider to actively change the command signals of a computer in accordance with responses such as deformation and force of a specimen generated by vibrations applied by an actuator.

A hybrid experiment using a remote site computer and an actuator becomes possible by combining these conventional techniques, i.e., by interconnecting a computer for numerical simulation and a controller for an actuator. However, such a hybrid experiment is difficult to realize from the following reasons: a transmission speed of data over a network is generally not constant so that an actuator cannot be driven smoothly; the computers are required to make various settings for the control of actuators so that these settings are not suitable for general purposes; and other reasons.

SUMMARY OF THE INVENTION

The present invention has been made to solve the above-described problems of the conventional techniques regarding an experiment system and method which evaluate the strength and reliability of a massive structure relative to, for example, earthquakes. It is an object of the present invention to provide a testing system which can retain a test operability even if some actuator does not operate normally and is effective in using a computer and one or a plurality of actuators.

The above object of the invention can be achieved by one of the following aspects of the invention.

(1) According to one aspect of the invention, there is provided a vibration testing system for repetitively performing a series of processes including numerical simulation, waveform generation, actuator driving, and measurement, comprising:

one or a plurality of shaking systems each having an actuator with a movable part for applying deformation to a specimen, a control sensor for measuring a driving state of the actuator, an actuator controller for controlling the driving state of the actuator by using an input command signal and an output of the control sensor, and a monitor sensor for measuring a response state of the specimen; and a computer system in which one or a plurality of computers provide a measurement processing function of processing an output of the monitor sensor in a format capable of being used by a numerical simulation function, the numerical simulation function of calculating a vibration response at a predetermined time interval in accordance with a preset structure numerical model, a process result of the measurement processing function, and a time function given as an external force applied to a structure, and a waveform generating function of calculating the time function of deformation to be applied to the specimen in accordance with a process result of the numerical simulation function and outputting the calculated time function to the actuator controller, wherein the computer system provides:

a model substituting function of modeling characteristics of the specimen to be shaken by the shaking system by using the finite number of parameters, calculating a response quantity of a shaking machine driving state, and inputting the response quantity to the numerical simulation function;

a parameter modification function of comparing a calculation result of the model substituting function and a process result of the measurement processing function and modifying the values of the parameters so that the characteristics of the actual specimen are made generally coincident with characteristics of a specimen formed by the model substituting function; and an abnormality inspection function of judging an operation state of each shaking system and changing the process result of the measurement processing function to be passed to the numerical simulation function to a process result of the model substituting function.

(2) According to a second aspect of the present invention, there is provided a vibration testing system for repetitively performing a series of processes including numerical simulation, waveform generation, actuator driving, and measurement, comprising:

one or a plurality of shaking systems each having an actuator with a movable part for applying deformation to a specimen, a control sensor for measuring a driving state of the actuator, an actuator controller for controlling the driving state of the actuator by using an input command signal and an output of the control sensor, and a monitor sensor for measuring a response state of the specimen; and a computer system in which one or a plurality of computers provide a measurement processing function of processing an output of the monitor sensor in a format capable of being used by a numerical simulation function, the numerical simulation function of calculating a vibration response at a predetermined time interval in accordance with a preset structure numerical model, an output of the monitor sensor, and a time function given as an external force applied to a structure, and a waveform generating function of calculating the time function of deformation to be applied to the specimen in accordance with a process result of the numerical simulation function and outputting as a command signal the calculated time function to the actuator controller, wherein:

the computer system has a main computer having the numerical simulation function and a sub-computer provided at each shaking system, (having the measurement processing function and the waveform generating function,) inputting an output of the monitor control, and outputting the command signal to the actuator controller; and the main computer and the sub-computer transfer data by communications.

(3) In the vibration testing system described in (1), the computer system preferably has a main computer having the numerical simulation function, the model substituting function, the parameter modification function and the abnormality inspection function and a sub-computer provided at each shaking system and having the measurement processing function and the waveform generating function, and the main computer and the sub-computer transfer data by communications.

(4) In the vibration testing system described in (1) or (2), a signal measured with the control sensor preferably includes a displacement signal, and a signal measured with the monitor sensor preferably includes a reaction force of the specimen relative to displacement applied to the actuator.

(5) In the vibration testing system. described in (2) or (3), a means for the communications is preferably the Internet.

(6) In the vibration testing system described in (2) or (3), the main computer and the sub-computer each preferably have a timer set with the same time; in the main computer, a time when the numerical simulation function starts operating is designated as a designated time when a first step of an output of the numerical simulation function is to be established at each of following steps, as the designated time, a time designated at a previous step added with a predetermined time increment is designated, and a set of an output of the numerical simulation function and the designated time is input to the waveform generating function of the sub-computer; in the sub-computer, the waveform generating function generates a waveform so that the driving state of the actuator corresponding to a process result of the numerical simulation function is established at the designated time, and the measurement processing function acquires a measured value at the designated time; and the vibration test system repetitively performs a series of processes including numerical simulation, waveform generation, actuator driving, and measurement, at an interval of the predetermined time increment.

(7) In the vibration testing system described in any one of (1) to (6), the computer system preferably has an image display unit and an image processing function of generating image data representative of a vibration response of a structure by synthesizing a process result of the numerical simulation and measured data, and a process result of the image processing function is displayed on the image display unit.

BRIEF DESCRIPTION OF THE DRAWINGS

FIG. 7 is a flow chart illustrating the details of an abnormality inspection process of the embodiment.

FIG. 8 is a time table showing the operation of the vibration testing system of the embodiment.

FIG. 9 is a time table showing the operation of the vibration testing system of the embodiment.

DESCRIPTION OF THE EMBODIMENTS

Embodiments of the invention will be described with reference to the accompanying drawings.

Figure 2A:
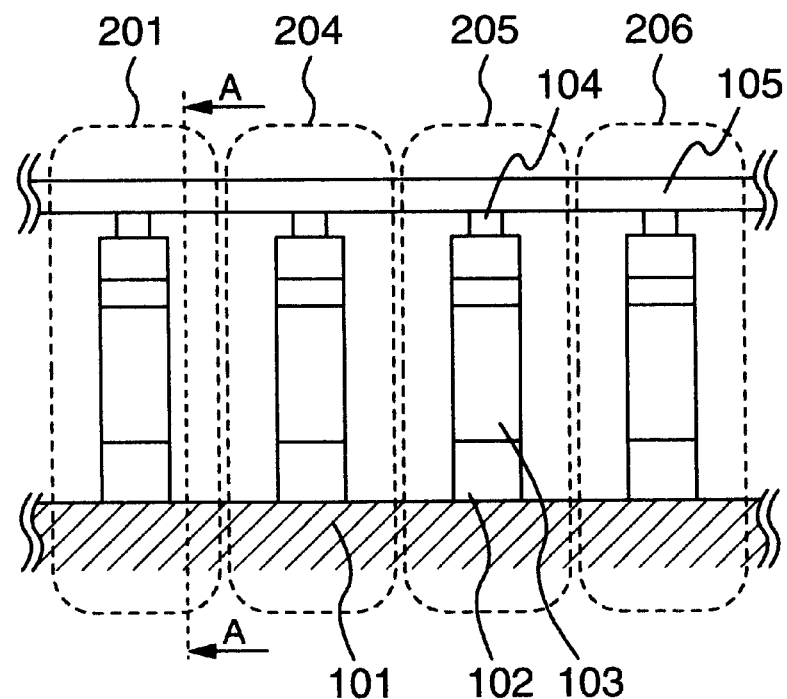
FIG. 2A is a schematic diagram of a bridge as structure to be evaluated, according to an embodiment of the invention.
Figure 2B:
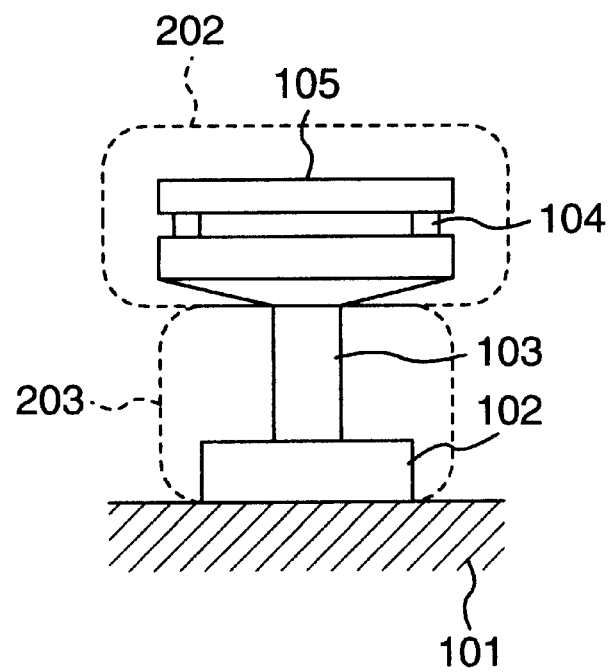
FIG. 2B is a cross sectional view taken along line A–A in FIG. 2A.

First, the hybrid experiment approach according to conventional techniques will be described taking, as an example, aseismatic evaluation of a ridge shown in FIGS. 2A and 2B.

A bridge used by a highway or the like has the structure that a plurality of support structures each made of a footing 102 and a girder 103 are established on the ground 101 to support an upper structure 105 via a support member 104.

Consider that a vibration response when the girder 103 is shaken by an earthquake acceleration in the right and left directions as viewed in the A–A cross sectional view, is evaluated by hybrid experiments. It is assumed that all the girders move in the same manner and that one span 201 is considered separately. This separated structure 201 is divided into a numerical model part 202 and an actual model part 203.

Figure 3:
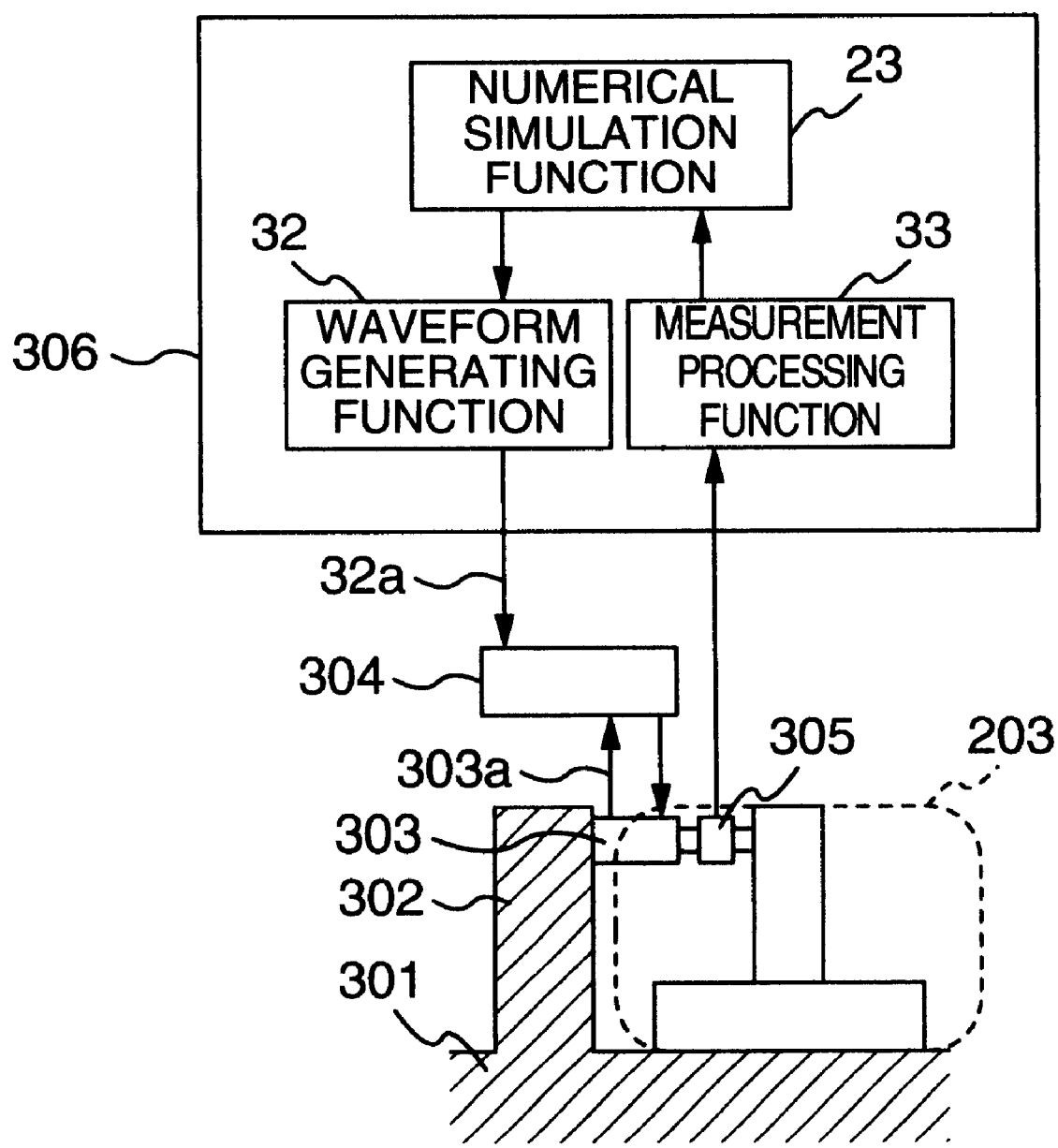
FIG. 3 is a schematic diagram of a hybrid experiment machine according to conventional techniques.

A test system has the structure shown in FIG. 3. The actual model 203 (hereinafter called a specimen) is fixed to a foundation 301. A movable part of an actuator 303 fixed to a reaction wall 302 is connected to the specimen 203. In connecting the actuator 303 and specimen 203, a load cell 305 is disposed in order to be able to measure a reaction force generated by deformation applied by the actuator. The actuator 303 is controlled in such a manner that a difference between a feedback signal from a displacement measuring apparatus (not show) built in the actuator and a command value input to a actuator controller 304 becomes small. A computer 306 has a numerical simulation function 23, a waveform generating function 32 and a measurement processing function 33, and generates and outputs the command value to the shaking machine controller 304. In calculating this command value, an output from the load cell 305 is used.

The command value is calculated by the computer 306 in the following manner. The numerical simulation function 23 calculates the vibration response of the numerical model part 202 by the following equation of motion:

$$[M]\{\ddot{x}\}+[C]\{\dot{x}\}+[k]\{x\}=\{q\}+\{f\} \quad (1)$$

where [M], [C] and [K] represent a mass, a damping, and a stiffness matrix of the numerical model, respectively, $\{x\}$ represents a displacement vector, $\{q\}$ represents an external force vector by an earthquake, $\{f\}$ represents a vector of a reaction force generated at the boundary point between the numerical model and actual model, and the overdot represents a differential with respect to time. In the displacement vector, a displacement in a region corresponding to the boundary point between the numerical model and real model is used as the command value to make a deformation in the specimen 203. If the $\{q\}$ and $\{f\}$, which is corresponding to external forces, are known, the vibration response displacement vector $\{x\}$ an be calculated from numerical value integration at each of predetermined small time steps. For example, according to the central difference method, the displacement vector $\{X\}_{i+1}$ at time tin, is calculated from the following equation:

$$\{x\}_{i+1} = \left\{[M] + \frac{\Delta t}{2}[C]\right\}^{-1}\left[[M](2\{x\}_i - \{x\}_{i-1}) + \frac{\Delta t}{2}[C]\{x\}_{i-1} + \Delta t^2(\{q\}_i + \{f\}_i - [k]\{x\}_i)\right] \quad (2)$$

where the suffix i means the value at time $t_i$.

Since $\{q\}_i$ necessary for this calculation is a test condition, it is stored beforehand in the computer or externally given during the test. A reaction force of the specimen 203 generated by a test is measured with a load cell 305, and an output of the load cell is properly processed by the measurement processing function 33 to use the result as the reaction force $\{f\}_i$. In accordance with the processed result of the numerical simulation function 23, the waveform generating function 32 calculates the time function of a displacement applied to the specimen and outputs the command value.

Namely, a shaking test and a vibration response calculation are performed in parallel by using the following procedure: (1) the reaction force $\{f\}_i$ is measured, (2) $\{X\}_{i+1}$ is calculated from the equation (2) by using the external force $\{q\}_i$ and the reaction force $\{f\}_i$, (3) the obtained displacement at the boundary point between the numerical model and actual model is applied to the specimen 203 by the actuator 305, and (4) the procedure returns to the step (1). These processes are repeated so that the vibration response of the whole of the structure can be evaluated through the shaking test performed for a partial structure.

In the above description, the actuator is driven in a displacement control and a measured value for vibration response evaluation is reaction force. The embodiment is not limited only thereto, but other combinations are possible.

According to the above-described conventional techniques, the computer 306 outputs a control signal directly to the actuator controller 304. It is therefore necessary to establish the computer 306, the actuator 303 and the actuator controller 304 at positions near to each other.

Figure 1:
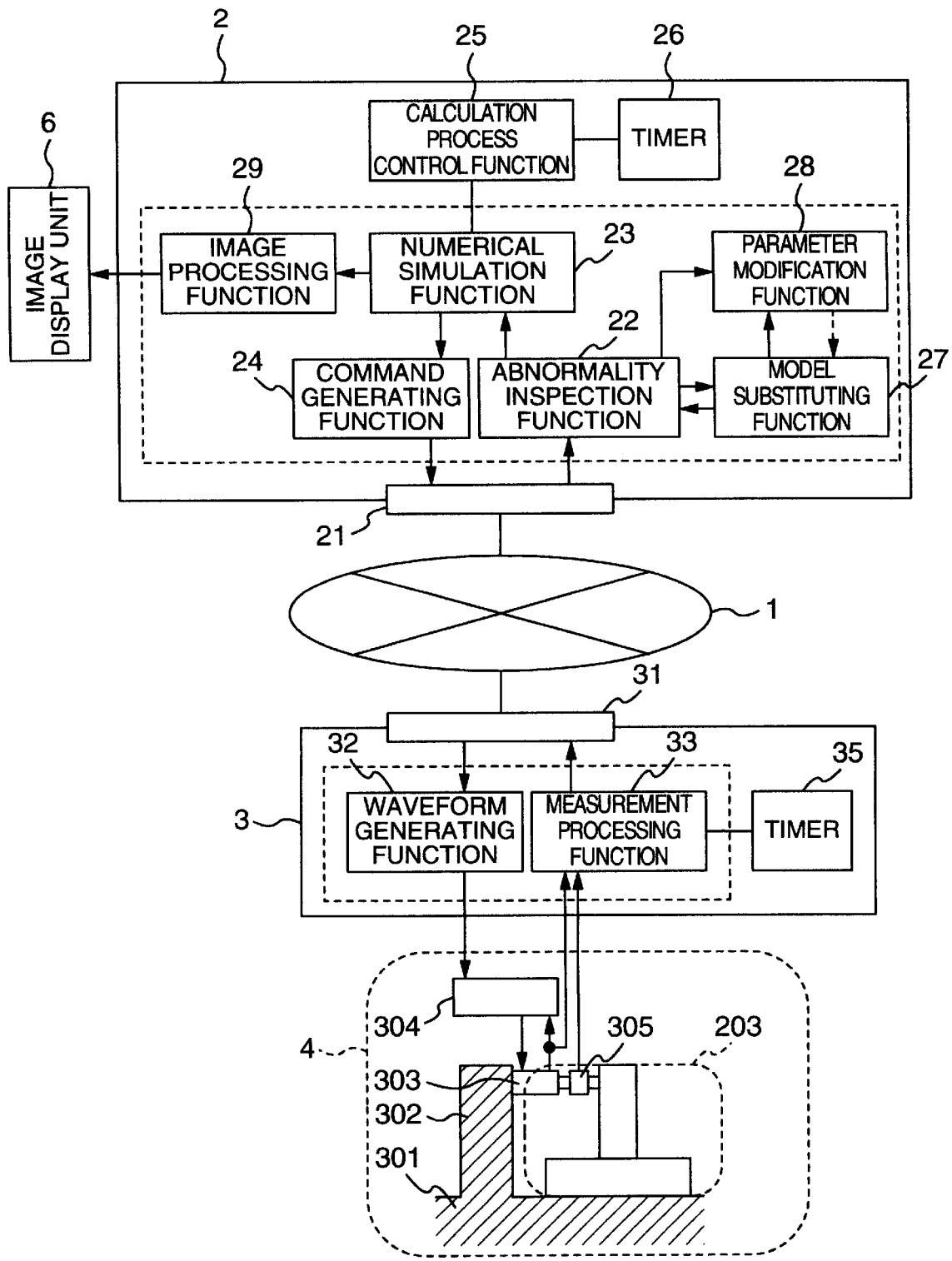
FIG. 1 is a diagram showing the structure of vibration testing system according to an embodiment the invention.

An embodiment of the invention will be described with reference to FIG. 1. In FIG. 1, some portions are drawn for other embodiments and the portions not described hereinunder are not directly relevant to this embodiment. The above-described conventional techniques cannot be used if the girders as the support structure have different characteristics and different dynamical behaviors. In such a case, actuators same in number as the number of support structures to be tested may be connected to the computer 306. However, the structure and dynamic characteristics of each actuator, the characteristics and installation conditions of each sensor and the like are different with shaking facilities and specimens. Therefore, if the waveform generating functions 32 and measurement processing functions 33 for all actuators are provided in the computer 306, the processes such as a data input process become complicated, and generality of the testing system is degraded. From this reason, the computer 306 is divided into a main computer 2 and sub-computers 3 provided for respective actuators. The main computer 2 is provided with the numerical simulation function 23, and the sub-computer 3 is provided with the waveform generating function 32 and measurement processing function 33. It is not often that one experiment site has a plurality of large actuators capable of shaking a massive structure. If complicated numerical simulation is to be performed, a high speed computer is required to be used as the compute 306. However, such a high speed computer is often utilized as shared facilities and established at a place remote from experiment sites. It is desired that the sub-computer 3 is established near to the actuator controller 304 in order to reduce noises to be contained in the command signal. In this embodiment, therefore, the actuator and the computer are coupled by using a network as communication means. The embodiment will be described more specifically in the following.

The vibration testing system is constituted of a network 1 for data transmission and reception between apparatuses connected to the network, a main computer 2 having a network connection function 21 and connected to the network, and one or a plurality of sub-computers 3 and shaking systems 4. In FIG. 1, only one set of the sub-computer 3 and shaking system 4 is shown. The shaking system 4 includes: (a) an actuataor 303 having a movable part for applying deformation to a specimen 203; (b) a control sensor (in this case a displacement sensor, not shown) for measuring a driving state of the actuator 303: (c) an actuator controller 304 for controlling the driving state of the actuator by using an input command signal and an output of the control sensor; and (d) a monitor sensor (in this case a load cell 305) for measuring a response state of the specimen 203. The sub-computer 3 has a network connection function 31 connectable to the network 1, outputs the command signal to the actuator controller 304, and receives an output from the monitor sensor 305.

The main computer 2 has a signal processing function (abnormality inspection function) 22, a numerical simulation function 23, a command generating function 24 and a calculation process control function 25. The signal processing function 22 processes measurement data transmitted from the sub-computer 3 via the network so as to allow the numerical simulation function 23 to use the processed data. The numerical simulation function 23 calculates a vibration response at preset timings in accordance with a preset structure numerical model, a processed result of the signal processing function 22 and a time function given as an external force applied to the structure. The command generating function 24 generates command information for driving the shaking system 4 in accordance with a calculation result by the numerical simulation function 23 and transmits the command information to the shaking system controller 3 via the network 1. The calculation process control function 25 repetitively controls the processes including measurement data acquisition, signal processing, numerical simulation, command signal generation, and command information transmission.

The sub-computer 3 has a waveform generating function 32 and a measurement processing function 33. The waveform generating function 32 generates a time function for the control of the actuator 203 in accordance with the command information transmitted from the main computer 2 via the network 1, and outputs the time function as the command signal to the actuator controller 304. The measurement processing function 33 decides the timing for measuring an output value from the monitor sensor, acquires the output value based on the decision, generates the measurement information in accordance with the acquired output value, and transmits it to the computer 2 via the network 1. In order to decide the timing when the output value of the monitor sensor is acquired, the measurement processing function 33 uses, for example, an output of the control sensor.

Figure 6:
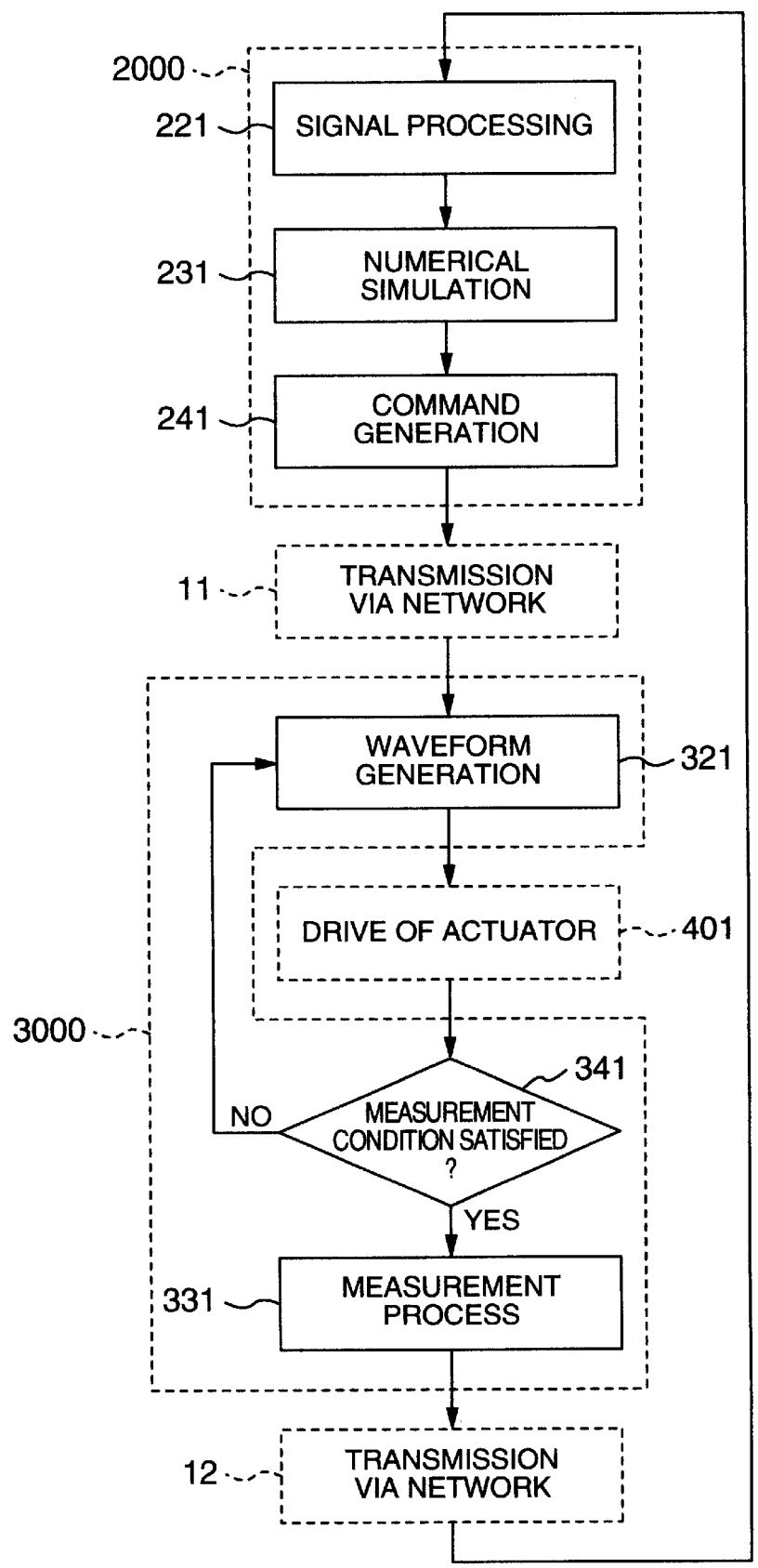
FIG. 6 is a flow chart illustrating the operation of the vibration testing system of the embodiment.

The vibration test by the vibration testing system of this embodiment will be described with reference to the flow chart shown in FIG. 6.

In the main computer 2, the following process 2000 is executed. The main computer 2 receives the measurement result of the sub-computer 3 transmitted via the network 1, and the signal processing function 22 executes a process of signal processing (block 221). Specifically, the signal processing function converts the measurement result transmitted via the network into the format capable of being processed by the numerical simulation function, or if a test using a plurality of shaking systems 4 is to be performed, measurement results at the shaking systems are loaded in one file, to thereby generate data to be passed to the numerical simulation function. Upon reception of the data, the numerical simulation function 23 performs a numerical simulation (block 231). Specifically, as described earlier, a process, for example, described in the equation (2), is executed in accordance with the equation of motion (1). It is therefore necessary that the numerical model is input beforehand to the main computer 2 and that $\{f\}_i$ corresponding to the external force is sequentially supplied to the numerical simulation function. The result of the numerical simulation is sent to the command generation function 24 whereat a command generation process (block 241) is executed. Specifically, a deformation quantity to be applied to the specimen 203 is calculated from the numerical simulation result, and transmitted to a destination site on the network. In order to execute these processes in the correct order, the calculation processing function 25 manages the calculation processing.

The generated command data is transmitted (block 11) to the sub-computer 3 via the network 1. The following process is performed in the shaking system 4, mainly including a process 3000 to be executed by the sub-computer 3. The sub-computer 3 receives the processed result of the main computer 2 via the network 1. In accordance with this processed result, the waveform generating function 32 executes a waveform generation process (block 321) for driving the actuator. Specifically, the waveform generating function 32 converts the processed result received via the network into the format capable of being used for waveform generation, generates a time function of a command signal for driving the actuator from the current actuator driving state to the designated driving state, in the format suitable for the actuator to be controlled, and sends the time function to the actuator controller 304 as the command signal. In accordance with this command signal, the actuator is driven (block 401). The measurement processing function 33 sequentially judges whether the measurement condition is satisfied (block 341). The specific contents of waveform generation and measurement condition judgement will be described later. If the condition is satisfied, the measurement processing function 33 executes a measurement process 331. Specifically, the measured reaction force is converted into the format capable of being transmitted over the network, and transmitted to a designated destination on the network. Namely, this measured reaction force data is transmitted to the main computer 2 via the network 1 and used by the process 2000 in the computer 2 (block 12).

In the above description, although the start and end of this loop are not explained, it is obvious that the start and end are determined in the manner suitable for the system configuration similar to a usual repetition process. An emergency stop process may be used in addition to the usual process, similar to a general vibration testing system.

According to the embodiment, the detailed settings for the actuator control can be made by the sub-computer 3. Therefore, the operation of the main computer 2 can be simplified and used for general purposes. Since only the driving state target value is transmitted from the main computer 2 and the command signal itself for driving the actuator is generated by the sub-computer 3 so as to match the characteristics of the actuator, a proper actuator control is possible. The vibration testing system of the invention can be establish even if already established actuators 303 and actuator controllers 304 are used, by properly configuring the sub-computers 3 in accordance with the characteristics and performances thereof. A so-called hybrid experiment is possible by coupling the computers and shaking systems via a network, so that a test for a massive structure can be made economically.

Figure 4:
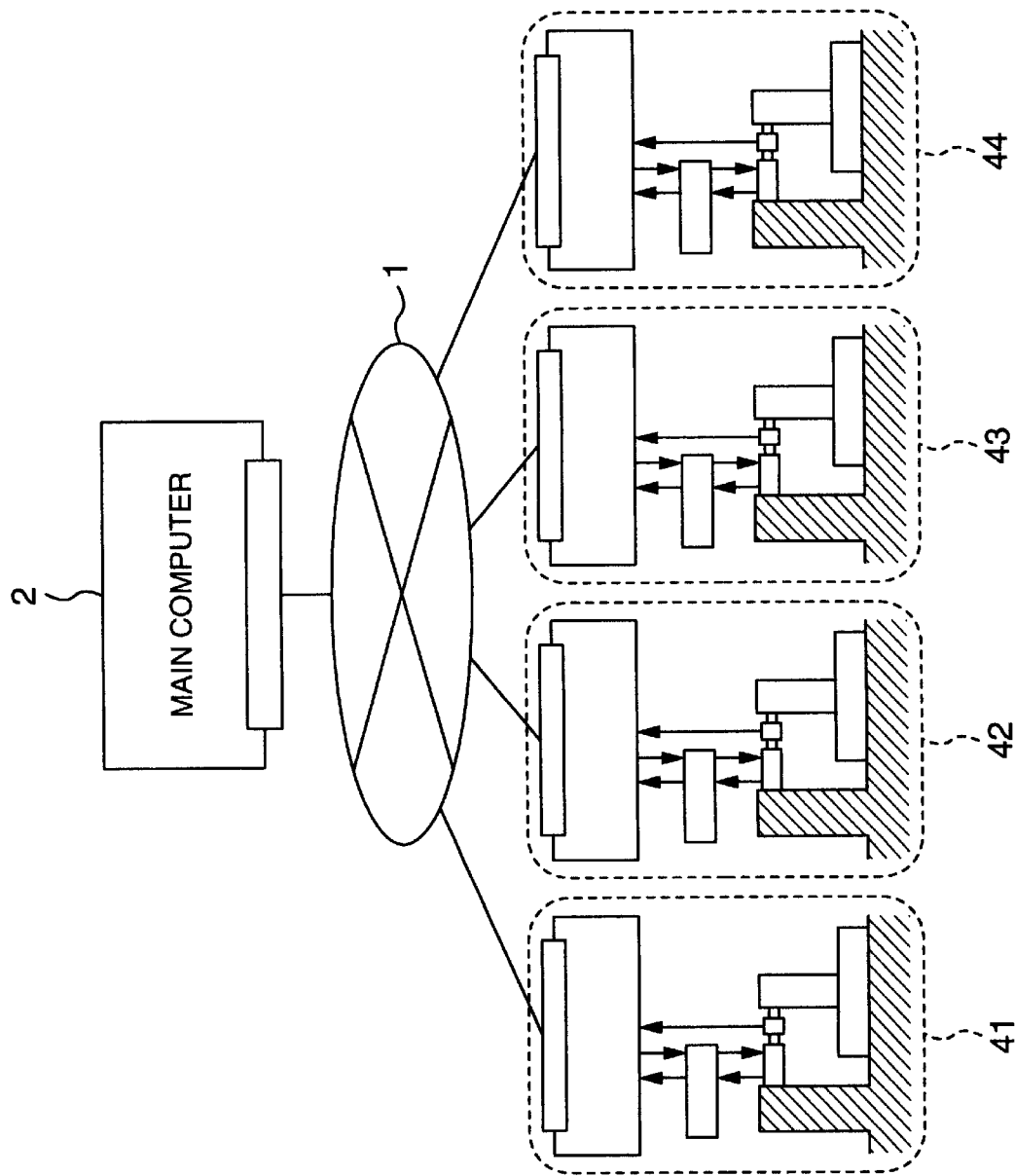
FIG. 4 is a diagram showing the structure of a vibration testing system according to another embodiment of the invention.

Only one shaking system 4 is described in the above embodiment of the invention in order to simplify the description. A test using a plurality of shaking systems in cooperation can also be performed by the invention. This will be described by taking as an example a vibration test for the bridge shown in FIGS. 2A and 2B. The bridge is supported by a plurality of girders whose characteristics and support conditions are different in some cases. In such cases, the above-described assumption that all the girders move in the same manner, cannot be satisfied. Not only the separated part 201 as in the embodiment shown in FIG. 1, but also other parts 204 to 206 are shaken. This case is illustrated in FIG. 4. With this arrangement, a vibration test of the structure more similar to the actual state can be performed. The use of the network provides a high advantage because the vibration test is performed by using a plurality of actuators established at remote positions in cooperation. In performing a vibration test in such an arrangement, it is obvious that the signal processing function 22 and command generating function 24 of the main computer 2 are required to take into consideration a use of sets 41 to 44 of a plurality of shaking systems and sub-computers, and that the numerical model used by the numerical simulation function 23 is made suitable for a plurality of specimens.

In the above embodiment, although a network is used as the communication means, the communication means is not limited thereto. The vibration testing system of this invention can be achieved by changing the data transfer protocol in accordance with the communication means to be used. This is also applicable to the following embodiments.

Next, an example of the specific contents of the waveform generation and measurement timing decision will be described with reference to FIGS. 6 and 8.

The timing when the measurement processing function 33 acquires the output value of the monitor sensor is decided when a difference between the actual driving state of the actuator indicated by an output of the control sensor supplied to the sub-computer 3 and the command driving state of the actuator received by the waveform generating function 32 falls in a predetermined range. In FIG. 8, the driving state of the actuator to be controlled is represented by the actuator position by way of example. The lower graph shows the actuator position as a time function, and the upper blocks show a time table of the process contents along the horizontal direction (time) of the lower graph. At the first, the command signal does not take a value of the target position, but thereafter sequentially takes values which indicate positions toward the target position. Each time the command signal is generated and output, the actual displacement and target displacement are compared, and if the difference therebetween does not fall in the predetermined range, then a new command signal is generated and output. In this case, in order not to apply an impulsive load to the specimen, it is preferable that the start and end of driving the actuator are made smooth.

According to the embodiment, the response state of the specimen can be measured under the condition that the deformation state is almost coincident with the designated deformation state, so that the vibration response evaluation of the whole structure can be made at a high precision.

Another example of the specific contents of the waveform generation and measurement condition judgement will be described with reference to FIGS. 1, 6, and 9.

In this embodiment, as shown in FIG. 1, the main computer 2 and sub-computer 3 have timers 26 and 35, respectively, the same time being set to the timers. In the main computer 2, the command generating function 24 designates the time when the numerical simulation function 23 starts, as the designated time when the designated value of the driving state of the actuator 303 is to be achieved. At the following steps, the time designated at the previous step and added with a time step Δt is designated as the designated time. As the command information to be transmitted to the sub-computer 3, information containing a set of the designated value of the driving state of the actuator 303 and the designated time is generated. In the sub-computer 3, the waveform generating function 32 generates a waveform in order to achieve the designated value of the driving state at the designated time, and the measurement control function 34 designates the designated time as the timing when the measurement value is acquired. All the processes are executed at each predetermined time increment. In FIG. 9, the driving state of the actuator to be controlled is represented by the shaking machine position by way of example. The lower graph shows the actuator position as a time function, and the upper blocks show a time table of the process contents along the horizontal direction (time) of the lower graph.

The measurement result of the measurement process (block 331) by the sub-computer 3 is transmitted via the network (block 12) to the main computer which sequentially executes the processes of signal processing (block 221), numerical simulation (231) and command generation (241). The command information is transmitted via the network to the sub-computer 3 (block 11). Until the command information is received by the sub-computer 3, it is not certain how the actuator is driven from the designated displacement at the designated time at one step before to the next designated time. Therefore, for example, a waveform is generated by extrapolation of a past designated value (block 321*a*) to continue driving the actuator. When the next designated displacement information is received, the waveform is generated by correcting the trajectory of the command signal so that the designated displacement is achieved at the designated time (block 321*b*). In parallel to the block 321*b*, the measurement process control function 33 monitors the timer 35 (block 341) and the measurement process (block 331) is executed at the designated time.

According to this embodiment, not only the deformation state when the response state of the specimen is measured, but also the deformation change state can be made coincident with the state designated by the command signal. It is therefore possible to evaluate the vibration response of the whole structure at a higher precision.

Another embodiment will be described with reference to FIG. 1. In addition to the functions of the above-described embodiments, the computer 2 of this embodiment provides a model substituting function 27 and a parameter change function 28. The model substituting function 27 models the characteristics of a specimen to be shaken by a shaking system by using the finite number of parameters, and calculates a response quantity of the driving state of the actuator. The parameter change function 28 compares the calculation result of the model substituting function 27 and the signal processing result of the abnormality inspection function 22, and modifies the parameters to make the characteristics of an actual specimen be generally equal to the characteristics of the specimen or model made by the model substituting function. The abnormality inspection function 22 includes a process of signal processing of the above-described embodiment and checking the operation state of the shaking system 4. If it is judged-that the shaking system used for the test or the sub-computer is abnormal, the process result to be supplied to the numerical simulation function is changed from the process result obtained by the measurement data of the specimen shaken by the shaking system to the process result obtained by using the model substituting function 27.

A model of the specimen characteristic may be an elasto plastic element described, for example, by the Masing rule. It is assumed that a skeleton curve is defined by a generalized force P (e.g., shear force) as a function of a generalized displacement δ as:

$$P = f(\delta) \tag{3}$$

Figure 5:
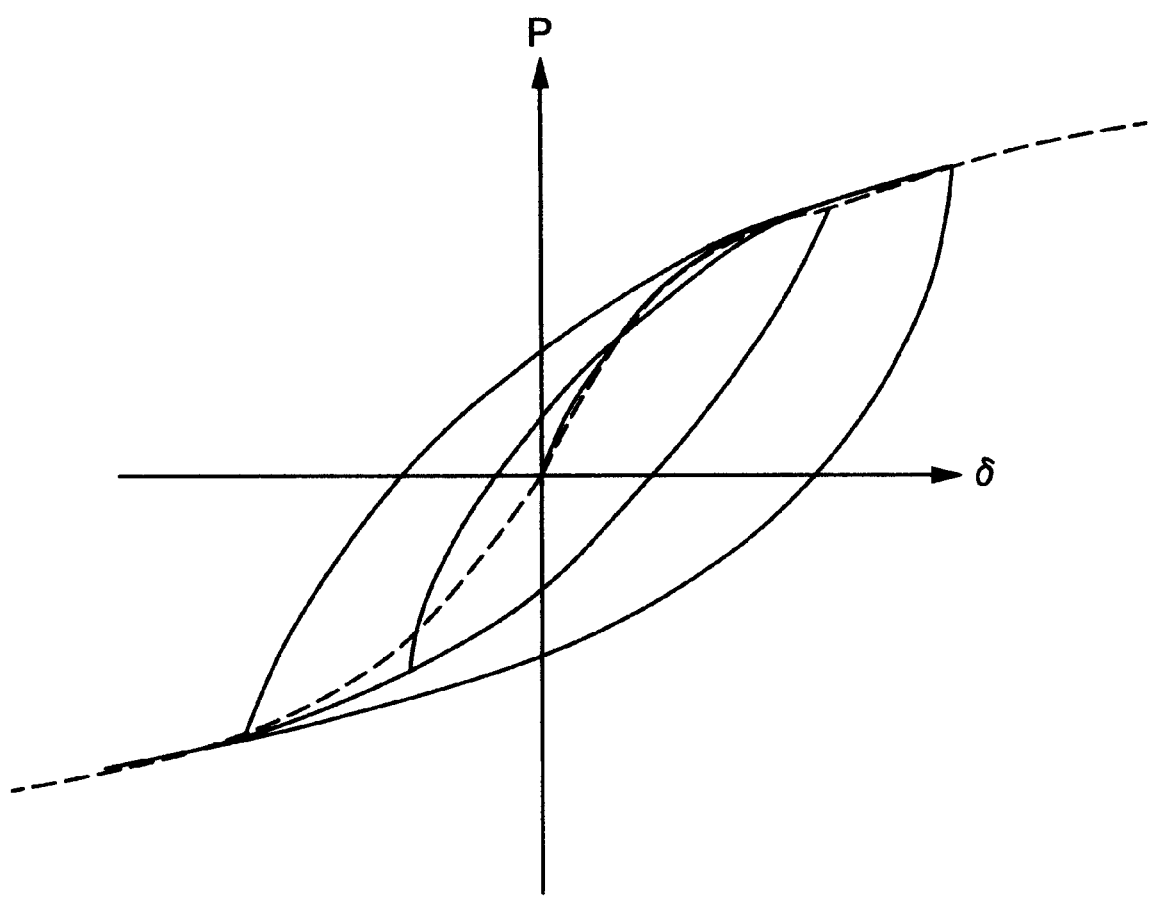
FIG. 5 is a graph showing load-displacement curves of a Ramberg-Osgood model.

By using this function, the relation between the generalized force P and generalized displacement δ after starting from a force Pr and displacement δr is determined as:

$$\frac{P - P_r}{m} = f\left(\frac{\delta - \delta_r}{m}\right) \quad (4)$$

where m represents a magnification factor of expanding a skeleton curve. The magnification factor m is generally set to 2 so that the force-displacement relation in the steady state reciprocating δ=−δ0 to δ0 can be obtained. It is assumed that when a load is applied again, the operation point moves on the unload curve after the operation point crossed the curve. The Ramberg-Osgood model is often used as the elasto plastic element, and the skeleton curve is given by:

$$\delta = \frac{P}{K_0}\left\{1 + \alpha\left(\frac{P}{P_y}\right)^\beta\right\} \quad (5)$$

where α, β, and Py represent parameters for determining the skeleton curve, and K0 represents an initial stiffness. An example of the displacement-load relation using this model is shown in FIG. 5. The characteristics of a specimen can be described roughly if the four parameters can be designated. The parameter modification function 28 compares the output of the model substituting function 27 and the process result obtained by using the measurement signal of the abnormality inspection function 22, and sequentially obtains the optimum values of the four parameters which fairly describe the characteristics of an actual specimen. In this manner, the precision of the model substituting function 27 can be improved.

FIG. 7 shows an example of the detailed flow chart of the abnormality inspection process of this embodiment. First the operation state of the shaking system is checked (block 222). If all the shaking systems operate normally, usual measurement data processing is performed (block 223). If an error occurs in some shaking system, the process result of the model substituting function 27 is acquired (block 224). The data to be passed to the numerical simulation function is generated (block 225), and the data to be passed to the model substituting function 27 and parameter change function 28 is also generated (blocks 226 and 227).

The operation state is checked, for example, in the following manner. The measurement process function 33 of the sub-computer 3 includes a process of checking the control state of the actuator, and the measurement data to be supplied to the main computer 2 contains the check result. The process of checking the operation state of the shaking system to be executed by the signal processing function 22 of the main computer 2 may use the check result data contained in the measurement data, and presence/absence data representative of a reception in a predetermined time of the measurement data after the command information is transmitted. If the former data is used, any trouble of the shaking system can be recognized, and if the latter data is used, communication errors to be caused by any trouble of the network can be recognized.

According to this embodiment, even if any trouble occurs in one shaking system during the vibration test using a plurality of shaking systems 4 and the measurement data of the specimen cannot be obtained, the response of the specimen can be simulated by the model substituting function 27 so that the test can continue. The danger that the test cost is lost by a failure of the test can be reduced. This advantage is also applied to a test system in which a computer is not divided into a main computer and a sub-computer.

In the description of the above embodiments, although the type of the network is not specifically described, a LAN dedicated to the test system may be used or the Internet may be used for the test system. In the latter case, the network configuration does not require a large cost, and a vibration testing system can be established which uses remote site shaking systems in cooperation, e.g., shaking systems in Japan and shaking systems in USA.

In any one of the above embodiments, as shown in FIG. 1, an image display unit 6 and an image processing function 29 may be used. The image display unit 6 is externally connected to the main computer 2. The image processing function 29 is provided in the main computer 2 and generates image data representative of a vibration response of a structure by using the process result of the numerical simulation function 23 and the measurement data. The process result of the image processing function 29 is displayed on the image display unit 6.

According to this embodiment, the operation state of a vibration test can be visually confirmed and the efficiency of the vibration test can be improved. The processed image data may be transmitted to each shaking system site via a network so that the whole operation state can be known at each site.

The invention has been described in connection with various embodiments. The invention is not limited only to the above-described embodiments, but it is obvious that various modifications are possible. Although the embodiments have been described using as an example the earthquake response evaluation, the invention is not limited only thereto, but evaluation of various structures under various load conditions are possible without departing from the scope of the present invention.

According to the invention, the hybrid experiment using a plurality of actuators can be made effectively and with high reliability. A vibration test can be made by using one remote site computer and a plurality of actuators interconnected by a network. It is therefore possible to make an experiment of evaluating the strength and reliability of a massive structure, for example, relative to an earthquake, and to make a test for general purposes at a high precision and with an economical cost.

What is claimed is:

1. A vibration testing system for repetitively performing a series of processes including numerical simulation, waveform generation, actuator driving, and measurement, comprising:

one or a plurality of shaking systems each having an actuator with a movable part for applying deformation to a specimen, a control sensor for measuring a driving state of the shaking machine, an actuator controller for controlling the driving state of the actuator by using an input command signal and an output of the control sensor, and a monitor sensor for measuring a response state of the specimen; and a computer system in which one or a plurality of computers provide a measurement processing function of processing an output of the monitor sensor in a format capable of being used by a numerical simulation function, the numerical simulation function of calculating a vibration response at a predetermined time interval in accordance with a preset structure numerical model, a process result of the measurement processing function, and a time function given as an external force applied to a structure, and a waveform generating function of calculating the time function of deformation to be applied to the specimen in accordance with a process result of the numerical simulation function and outputting the calculated time function to the shaking machine controller, wherein said computer system provides:

a model substituting function of modeling characteristics of the specimen to be shaken by the shaking system by using the finite number of parameters, calculating a specimen response quantity with respect to actuator driving state, and inputting the response quantity to the numerical simulation function;

a parameter modification function of comparing a calculation result of the model substituting function and a process result of the measurement processing function and modifying the values of the parameters so that characteristics of a specimen formed by the model substituting function are made generally coincident with the characteristics of the actual specimen; and an abnormality inspection function of judging an operation state of each shaking system and substituting the process result of the measurement processing function to be passed to the numerical simulation function to a process result of the model substituting function when an abnormal operating state is defected.

2. A vibration testing system according to claim 1, wherein a signal measured with the control sensor includes a displacement signal, and a signal measured with the monitor sensor includes a reaction force of the specimen relative to displacement applied to the actuator.

3. A vibration testing system according to claim 2, wherein the computer system has an image display unit and an image processing function of generating image data representative of a vibration response of a structure by synthesizing a process result of the numerical simulation and measured data, and a process result of the image processing function is displayed on the image display unit.

4. A vibration testing system according to claim 1, wherein the computer system has an image display unit and an image processing function of generating image data representative of a vibration response of a structure by synthesizing a process result of the numerical simulation and measured data, and a process result of the image processing function is displayed on the image display unit.

5. A vibration testing system for repetitively performing a series of processes including numerical simulation, waveform generation, actuator driving, and measurement, comprising:

one or a plurality of shaking systems each having an actuator with a movable part for applying deformation to a specimen, a control sensor for measuring a driving state of the actuator, an actuator controller for controlling the driving state of the actuator by using an input command signal and an output of the control sensor, and a monitor sensor for measuring a response state of the specimen; and a computer system in which one or a plurality of computers provide a measurement processing function of processing an output of the monitor sensor in a format capable of being used by a numerical simulation function, the numerical simulation function of calculating a vibration response at a predetermined time interval in accordance with a time function given as a preset structure numerical model, an output of the monitor sensor, and an external force applied to a structure, and a waveform generating function of calculating the time function of deformation to be applied to the specimen in accordance with a process result of the numerical simulation function and outputting as a command signal the calculated time function to the actuator controller, wherein:

said computer system has a main computer having the numerical simulation function and a sub-computer provided at each shaking system, having the measurement processing function and the waveform generating function, inputting an output of the monitor control, and outputting the command signal to the actuator controller; and the main computer and the sub-computer(s) transfer data by communications.

6. A vibration testing system according to claim 5, wherein:

said computer system has a main computer having the numerical simulation function, the model substituting function, the parameter modification function and the abnormality inspection function and a sub-computer provided at each shaking system and having the measurement processing function and the waveform generating function; and the main computer and the sub-computer(s) transfer data by communications.

7. A vibration testing system according to claim 6, wherein a means for the communications is the Internet.

8. A vibration testing system according to claim 7, wherein the computer system has an image display unit and an image processing function of generating image data representative of a vibration response of a structure by synthesizing a process result of the numerical simulation and measured data, and a process result of the image processing function is displayed on the image display unit.

9. A vibration testing system according to claim 6, wherein:

the main computer and the sub-computer each have a timer set with the same time;

in the main computer, a time when the numerical simulation function starts operating is designated as a designated time when an output of the numerical simulation function is to be achieved at a first step, at each of following steps, as the designated time, a time designated at a previous step added with a predetermined time increment is designated, and a set of an output of the numerical simulation function and the designated time is input to the waveform generating function of the sub-computer;

in the sub-computer, the waveform generating function generates a waveform so that the driving state of the actuator corresponding to a process result of the numerical simulation function is achieved at the designated time, and the measurement processing function acquires a measured value at the designated time; and the vibration test system repetitively performs a series of processes including numerical simulation, waveform generation, actuator driving, and measurement, at an interval of the predetermined time increment.

10. A vibration testing system according to claim 9, wherein the computer system has an image display unit and an image processing function of generating image data representative of a vibration response of a structure by synthesizing a process result of the numerical simulation and measured data, and a process result of the image processing function is displayed on the image display unit.

11. A vibration testing system according to claim 6, wherein the computer system has an image display unit and an image processing function of generating image data representative of a vibration response of a structure by synthesizing a process result of the numerical simulation and measured data, and a process result of the image processing function is displayed on the image display unit.

12. A vibration testing system according to claim 5, wherein a signal measured with the control sensor includes a displacement signal, and a signal measured with the monitor sensor includes a reaction force of the specimen relative to displacement applied to the actuator.

13. A vibration testing system according to claim 12, wherein the computer system has an image display unit and an image processing function of generating image data representative of a vibration response of a structure by synthesizing a process result of the numerical simulation and measured data, and a process result of the image processing function is displayed on the image display unit.

14. A vibration testing system according to claim 5, wherein a means for the communications is the Internet.

15. A vibration testing system according to claim 14, wherein the computer system has an image display unit and an image processing function of generating image data representative of a vibration response of a structure by synthesizing a process result of the numerical simulation and measured data, and a process result of the image processing function is displayed on the image display unit.

16. A vibration testing system according to claim 5, wherein:

the main computer and the sub-computer each have a timer set with the same time;

in the main computer, a time when the numerical simulation function starts operating is designated as a designated time when an output of the numerical simulation function is to be achieved at a first step, at each of following steps, as the designated time, a time designated at a previous step added with a predetermined time increment is designated, and a set of an output of the numerical simulation function and the designated time is input to the waveform generating function of the sub-computer;

in the sub-computer, the waveform generating function generates a waveform so that the driving state of the actuator corresponding to a process result of the numerical simulation function is achieved at the designated time, and the measurement processing function acquires a measured value at the designated time; and the vibration test system repetitively performs a series of processes including numerical simulation, waveform generation, actuator driving, and measurement, at an interval of the predetermined time increment.

17. A vibration testing system according to claim 16, wherein the computer system has an image display unit and an image processing function of generating image data representative of a vibration response of a structure by synthesizing a process result of the numerical simulation and measured data, and a process result of the image processing function is displayed on the image display unit.

18. A vibration testing system according to claim 5, wherein the computer system has an image display unit and an image processing function of generating image data representative of a vibration response of a structure by synthesizing a process result of the numerical simulation and measured data, and a process result of the image processing function is displayed on the image display unit.

* * * * *